T. R. DUGGAN.
PROCESS OF AND APPARATUS FOR SOFTENING WATER.
APPLICATION FILED SEPT. 26, 1917.

1,354,604.

Patented Oct. 5, 1920.
3 SHEETS—SHEET 1.

Witness
Chas. L. Griechaus.

Inventor
Thomas R. Duggan
By H. P. McElroy
his Attorney

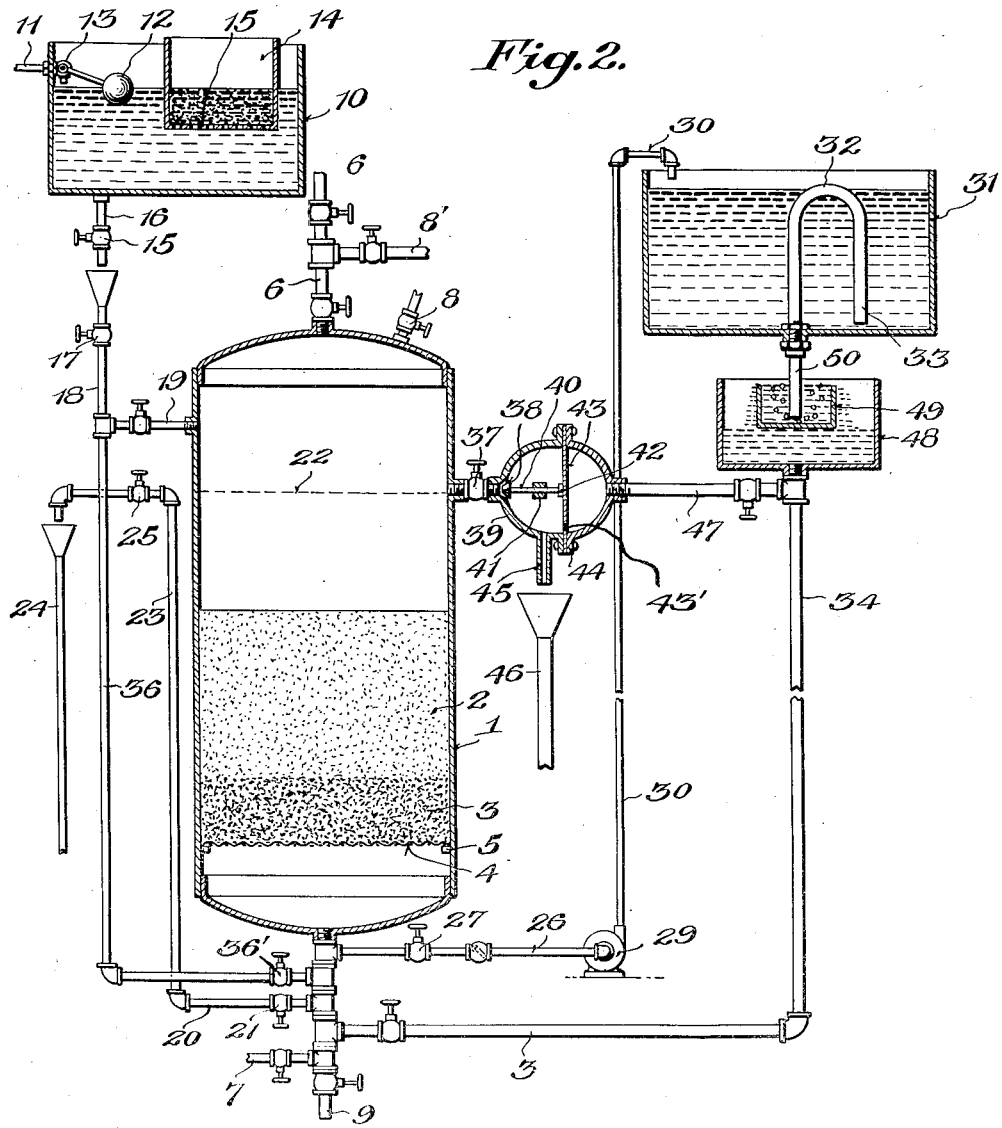

T. R. DUGGAN.
PROCESS OF AND APPARATUS FOR SOFTENING WATER.
APPLICATION FILED SEPT. 26, 1917.

1,354,604.

Patented Oct. 5, 1920.
3 SHEETS—SHEET 3.

Witness
Chas. L. Grieshauer

Inventor
Thomas R. Duggan
By K. P. McElroy
his Attorney

UNITED STATES PATENT OFFICE.

THOMAS R. DUGGAN, OF NEW YORK, N. Y., ASSIGNOR TO THE PERMUTIT COMPANY, OF NEW YORK, N. Y., A CORPORATION OF DELAWARE.

PROCESS OF AND APPARATUS FOR SOFTENING WATER.

1,354,604.  Specification of Letters Patent.  Patented Oct. 5, 1920.

Application filed September 26, 1917. Serial No. 193,326.

*To all whom it may concern:*

Be it known that I, THOMAS R. DUGGAN, a citizen of Great Britain, residing at New York, in the county of New York and State of New York, have invented certain new and useful Improvements in Processes of and Apparatus for Softening Water, of which the following is a specification.

This invention relates to processes of and apparatus for softening water; and it comprises a method of enhancing the activity of filter beds containing exchange silicates, of shortening the time necessary for revivification and of lengthening the time during which the bed of exchange silicates is used for softening water, wherein the water or regenerating liquid passing through the bed of exchange silicates is subjected to pulsations at intervals, such pulsations being of sufficient force to produce agitation and movement of the granules of said bed; and it also comprises as a new organization of apparatus elements the combination of a granular bed containing exchange silicates, of means for feeding raw water to be softened thereto and for removing softened water, means for washing the bed of exchange silicates, means for passing a regenerating salt solution through the bed and means for causing a pulsatory flow of liquids passing through the bed of exchange silicates; all as more fully hereinafter set forth and as claimed.

In the usual method of softening water by the use of exchange silicates, water to be softened is passed through certain materials containing silica and alumina (or another amphoteric oxid, such as titanium oxid, iron oxid, chromium oxid, tin oxid, zinc oxid, etc.) alkali and water. These materials are used in the form of small hard granules, which are employed as a granular bed through which the hard water is passed.

On the passage of hard water through the bed of granules, the lime and magnesia of the dissolved substances, to which the water owes its hardness, are taken up by the exchange silicates, alkali compounds going into solution in their lieu. After a period of use when the exchange silicates have taken up a certain amount of lime and magnesia, they are revivified or regenerated by passing a solution of sodium chlorid (common salt) through the bed. The lime and magnesia now go into solution as calcium and magnesium chlorids and the exchange silicates take up alkali again, so that they are ready for reuse after the adhering salt solution has been removed.

In operating one of these water softeners water to be softened is run through a bed of active silicates as long as effective softening is produced; that is as long as the exchange silicate maintains a high degree of activity. If the water is muddy or dirty there may then be a washing step; a current of water is run through the bed of exchange silicates to detach and carry away suspended matter which has been filtered out. Whether a washing operation is necessary after every softening operation of course depends on the purity of the water. Often the water is so clear that washing is necessary only at intervals. The silicates are then treated with a flow of salt solution for regeneration; and after regeneration all the salt solution is again washed out; the apparatus is flushed with water until the salt solution disappears. It is then again ready for use in softening water.

The washing to get rid of dirt may be conducted in various ways. Sometimes it is done by backwashing; *i. e.* by sending a flow of water through in a direction the reverse of that used in filtering. Where the latter flow is downward, the former is of course upward and this, particularly if the backwashing flow is at a relatively high speed (which however requires rather large volumes of water to be sent to waste) serves to some extent the purpose since the granules are lifted and spaced apart by the action of the current, allowing extrication and removal of the foreign matter or dirt. Where filtration is upward the impurities collect on the lower face of the filter and backwashing, that is downward passage of the wash water, is not very efficient since the downward pressure compacts the filter. With downward backwashing, ordinarily other means, such as stirring, blowing in air, etc., must be used to disaggregate the bed and facilitate the washing. Washing upwardly may be employed even when the filtration is upwardly. In this event the impurities must be carried through the whole bed, which can only be done quickly and efficiently if the granules of the bed are spaced apart. Therefore the speed of the wash water must either be sufficiently high, or other suitable means must be employed to disaggregate the bed; high speed of the water may also be applied combined with such other means.

Where the salt solution or the flushing water used to get rid of it, are used in backwashing (as they may be) the same considerations apply.

Other things being equal, it is obvious that the efficiency of any given water softening apparatus depends upon the ratio of the time during which it can be kept in softening or operative phase to the time required for these cleaning and regenerating phases. It is desirable that the bed of exchange silicates be kept in softening phase as long as possible and that the other operations be quickly effected.

Softening water by these exchange silicates is largely a surface action; that is, other things being equal, the amount of flowing water which can be efficiently softened by a given amount of a given type of exchange silicates, depends on the surface of silicates exposed to the water; and it is only what may be termed the "free faces" that are particularly operative; that is, the faces in contact with which the water can pass freely. Quick regeneration also depends upon the area of the free faces exposed to the salt solution. In other words, the efficiency of one of these filters is largely conditioned on the way in which the granules occur in the filter bed. But since granular material in a bed exposed to a flow of water tends to pack together in use, the degree of packing increasing more or less with time, in order to maintain the efficiency of this type of apparatus some means must be adopted for counteracting packing. In the prior art, mechanical stirrers have sometimes been used and sometimes it has been endeavored to effect disaggregation of the filter bed and to counteract the packing effect by various ways of transmitting the various flows of liquids through the filter as in the stated upward washing. These methods however have not been as effective as could be desired; and in the present invention I have devised a positive means of effecting this disaggregation.

In order to accomplish this result I simply impart to the liquids flowing through the filter a pulsation at intervals; this pulsation being energetic enough to lift and move the particles of the bed of exchange silicates so that their relative position to each other can be, and is changed. I use this sudden pulsation during the flow of the water to be softened, and ordinarily I employ it during one or more of the other flows. Where the water is clear and the filtering function is subordinate, as it often is, pulsation may be freely employed during the softening phase. This pulsation in the flow of the liquids may be effected in very many ways; but a convenient way is to employ a siphon action; a portion of the liquid flowing through the bed being by-passed into an elevated tank wherein it accumulates until enough is present to start a siphon into action. Thereupon this body of water is suddenly sent into the filter bed. While the present invention relates more particularly to water softening apparatus employing zeolites in which mechanical filtration is not the primary purpose and which operate better on previously filtered water, it is also useful in connection with mechanical filters using a granular bed, preventing or obviating channeling, etc.

In the accompanying drawings I have shown apparatus within the purview of this invention and adapted for carrying out the described process. In the drawings Figure 1 is a vertical section through one form of the apparatus, certain parts being shown in elevation;

Fig. 2 is a similar view in different form showing a different way of carrying out the process;

Figure 1:
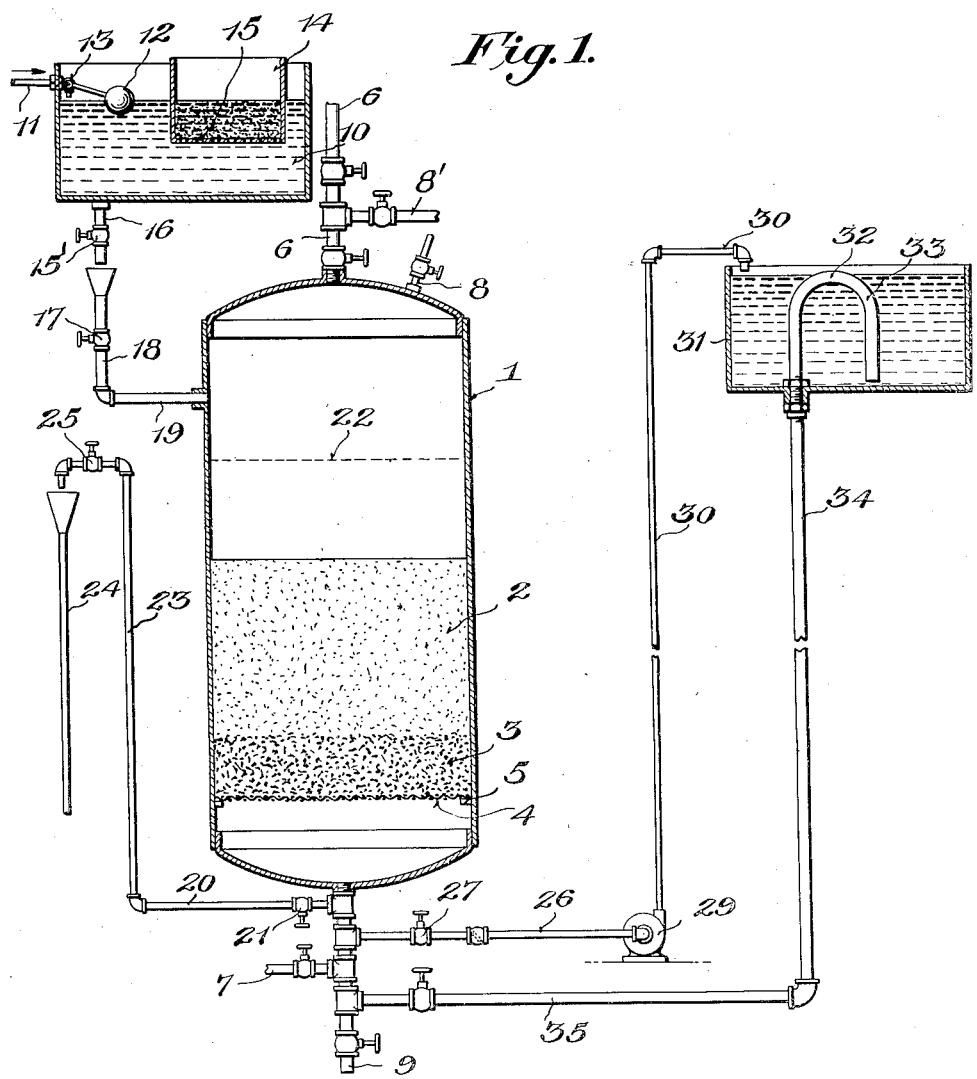

Referring to the drawings, 1 indicates a casing or tank containing a body of exchange silicates 2 supported upon a bed 3 of sand or similar inert material, this bed in turn resting upon a screen 4 supported by an annulus 5. Raw water to be softened is admitted through the valved pipe 6 and after flowing through the exchange silicates and after being softened is removed through valved pipe 7 and conducted to a place of use. Vent pipe 8 is provided to admit or remove air when necessary. When the exchange power of the silicates is exhausted, or substantially exhausted, wash water may be admitted through pipe 7, or pipe 9, which may be arranged so that they can be connected with a suitable source of raw water; the wash water being removed through valve piped line 8′. Often this washing process is not necessary; but it is to be understood that in event it is used the pulsation process and apparatus hereinafter described may be used in combination with it. After the softening phase of operating, or after the softening and the washing just described, it is necessary to regenerate. For this purpose a solution of salt is passed through the filter from tank 10. This tank is supplied with water through pipe 11, the level being controlled by means of the float 12 and valve 13. In the tank is a salt box 14 perforated at the bottom as indicated by 15. On filling the tank with water a solution of salt is made. Upon opening valve 15' in the salt solution pipe 16 and valve 17 in pipe 18 salt solution flows into the casing by horizontal pipe 19. Passing downward through the bed of exchange silicates it goes to exit through pipe 20, valve 21 being opened. The salt solution in the casing after reaching the level shown by dotted line 22 flows through pipe 23 emptying into pipe 24. Valve 25 is open during this operaton. The salt solution is permitted to flow through the apparatus at a predetermined rate, part of it passing in the path just described, i. e., to 24. But a portion of the solution passing through the bed of exchange silicates is led by pipe 26 (valve 27 being open) to a pump 29 which delivers it through riser pipe 30 into pulsation box 31. The pulsation box is provided with a siphon 32, one leg 33 of which is open and at the bottom of the pulsation tank while the other leg 34 leads to pipe 35 connected to the bottom of the casing. Pipes 34 and 35 being of larger diameter than pipe 23 the operation of the siphon results in a sudden flow of salt solution upwardly in the casing; a flow sufficient to lift bodily the bed of exchange silicates and cause a rearrangement of the granules thereof. Pump 29 may be in continuous operation during the revivifying phase and the pulsation process repeated from time to time, during the whole flow of the salt solution from the salt tank or box 10 through the bed and to waste through 24. Usually I provide merely sufficient salt in salt box 14 to revivify the silicates 2. When this charge of salt is exhausted, fresh water continues to flow through 11 and 13 into the box 10 and this water now serves as washing or flushing water to carry away any solution of salt adhering to the silicates, or any impurities which may be present therein. During this washing or flushing operation the pulsation apparatus may continue in use to disturb the filter bed and permit a positive and thorough washing or flushing.

After completion of the regeneration and washing phases the apparatus is ready for the operative or water softening phase. Instead of introducing the raw water through 6 at this stage of the operation it may be supplied through box 10, this being of course at a time when it contains no salt. In this event also, the pulsation apparatus may be operated as above described. In this manner of operating, the normal flow of water to be softened is through the salt tank (which however does not then contain salt) and thence through the casing. In so flowing, pump 29 may be kept in operation to cause periodical disturbances of the body of silicates as before; this disturbance now being with the aid of the water undergoing the softening operation.

As will be observed, I may apply the pulsation at any stage of the operation, during regeneration, during the washing or flushing operation or during the water softening phase itself.

In Fig. 2 I have illustrated a form of apparatus in which the salt solution may be sent through the apparatus either upwardly or downwardly, either by pipe 19 (as in Fig. 1) with exit through 20, 23 and 24, or directly to the bottom of the casing 1 through pipe 36, valved at 36'. In this event the salt solution flows upwardly. When it reaches the level indicated by dotted line 22 it flows through valved outlet 37 past valve 38 into and through a diaphragmed casing 39. The valve carries a stem 40 operating in guide 41 and having its head 42 in engagement with a diaphragm 43 held in the casing between the legs 44 thereof. The salt solution after passing valve 38 of the casing finds exit at 45 into the waste pipe 46. During this operation pump 29 constantly forces a portion of the salt solution through pipe 30 into the pulsation box 31. When the siphon 32 operates the salt solution suddenly flows into leg 34 and operates as is the case with the apparatus of Fig. 1, except that a portion of the salt solution by-passes through pipe 47 into the casing 39 and presses the diaphragm 42 to the left thus seating valve 38 in its seat, and, for a short period of time, preventing the exit of salt solution through 37. Since the salt solution is flowing upwardly and since the pulsation is upwardly, if this pipe (37) were left open there would be a chance for escape of granules of silicates buoyed up and carried forward by the rush of liquid. The closing of valve 38 prevents this during the pulsation period. After the salt solution is siphoned out of 31, the salt solution in the casing again passes through pipe 37 into the casing 39 and thence to waste. Any solution which is in the casing at the right of the diaphram leaks through small hole 43' and thence to waste through 45. In Fig. 2 I have also shown means for releasing any checked air in the siphon. This comprises the air release box 48 in auxiliary liquid sealing box 49 into which the siphon leg 50 depends. The salt solution (or water as the case may be) overflows the auxiliary box 49 into box 48, releasing any air which may be trapped in the siphon. The apparatus shown in Fig. 2 may operate either with the salt solution flowing upwardly or downwardly. When the salt solution flows downwardly the necessity for the provision of the casing 39 with its diaphragm valve does not exist.

Figure 3:
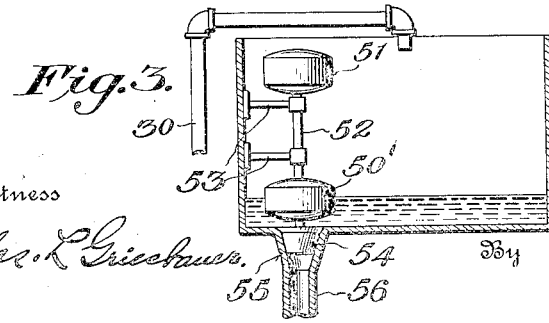
Fig. 3 is a detail section of one form of pulsation box.

In Fig. 3 I have shown a modification of my invention wherein the siphon is dispensed with. In this view the pulsation box 31 is provided with a float having two buoyant members 50' and 51 slidably carried by rod 52 mounted in brackets 53. The lower float carries valve 54 adapted to seal in seat 55 and close it. When the pump is supplied with sufficient salt solution or wash water to the tank 31 to lift the floats 50' and 51 the water will suddenly rush out of pipe 56 to the tank 1 and cause the pulsation as described.

Figure 4:
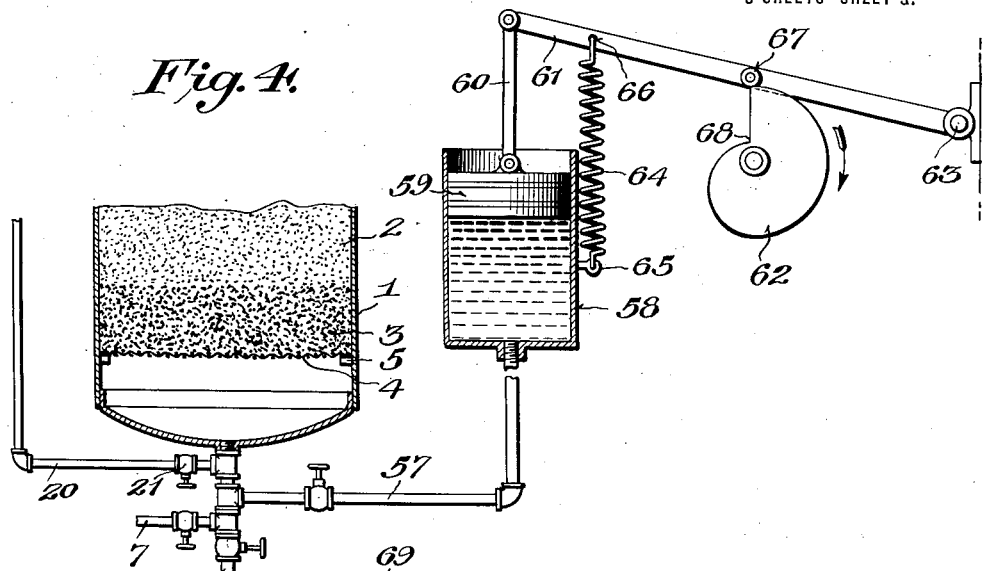
Fig. 4 is a segmental vertical section, partly in elevation of another form of pulsation box, showing pipe connections to the filter.

Still other methods of causing a pulsation may be used. In Fig. 4 I have shown a form of apparatus wherein the pulsations are caused to take place by means of a pump-like device. In this modification the pump 29 is dispensed with and a portion of water or salt solution may flow from the bottom of the casing 1 through pipe 57 to a cylinder 58 provided with piston 59 carried by rod 60 connected to link 61 extending past cam 62 and pivoted at 63. The arm 61 is normally spring pulled downwardly by spring 64 connected at 65 to the cylinder and at 66 to the link. The salt solution or water flows in through 57 and fills the cylinder 58 to a predetermined point. During this time the cam 62 is revolved at a predetermined rate corresponding with the rise of the piston 59. The link 61 carries a roller bearing 67 in engagement with the face of the cam. The cam is stepped as shown at 68 and as it revolves it gradually raises link 61 until the roller bearing 67 reaches the stepped portion 68 when the arm and the piston suddenly descend due to the pull of the spring 64. This operation results in a pulsation.

Figure 5:
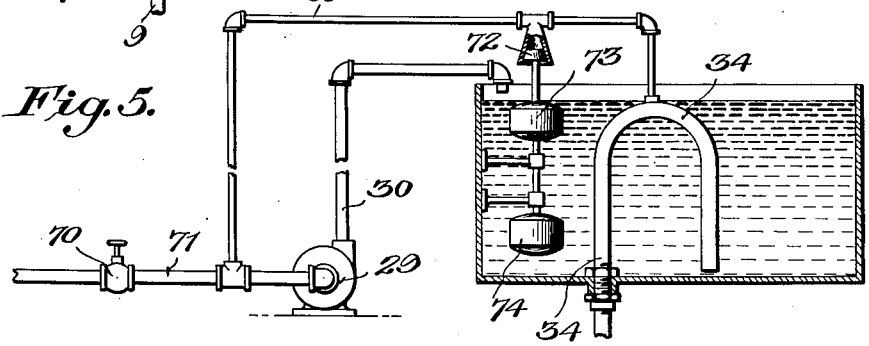
Fig. 5 is a vertical section through a pulsation box showing a modified form and illustrating the pipe connections to the filter, the filter being omitted.

In the operation of some of the siphons previously described, air of course gains access to the siphon pipe between siphonings and passes thence to the filter casing. When it is considered desirable to prevent this, the means shown in Fig. 5 may be employed. As there illustrated, the suction side of the pump 29 may be connected with the highest point of the siphon through pipe 69 in order to suck off the air in 34 and discharge it through pipe line 30. In this event the provision of a small float valve connected to a 3-way joint at the highest level of the siphon is advisable, in order to prevent the siphon from starting before the tank is completely filled. In order to produce a vacuum for this purpose the valve 70 in suction line 71 may be throttled to such a degree that a negative head will always be maintained between the valve 70 and the circulating pump 29. As shown such a valve, 72, is carried by a double float 73—74. This valve can only be opened (lowered) if the float 73 is above the water level and the float 74 is only partly submerged. The weight of both floats together with the weight of valve 72 is great enough to overcome the force with which the atmospheric pressure causes the valve 72 to seat itself. The floating power of float 74 is not great enough to lift the float 73 and the valve 72. Valve 72 can only be closed if the float 73 is submerged in the water and its floating action added to the floating action of the float 74.

Figure 6:
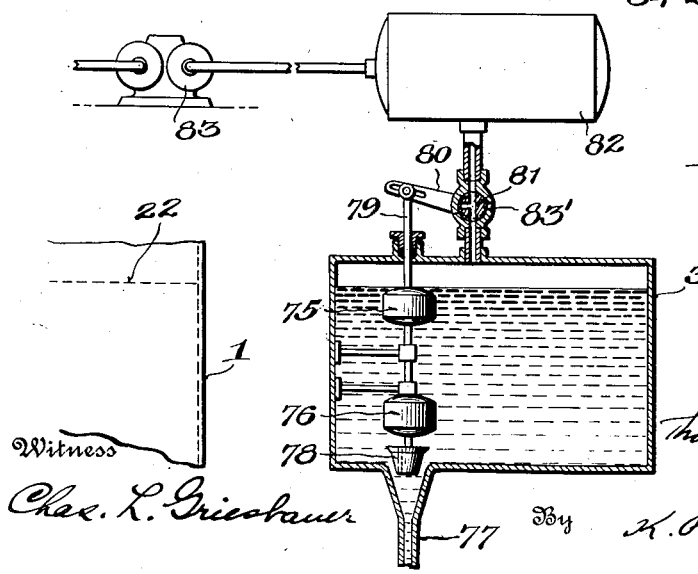
Fig. 6 is a vertical section through another form of pulsation tank, the filter being shown diagrammatically and a pump and compressor being shown diagrammatically in elevation.

Another method of causing the pulsation is illustrated in Fig. 6 wherein the casing 1 is merely indicated to the left of the pulsation tank 31. In this view I provide a double float 75—76 as in Fig. 5 and do not use a circulating pump. The pulsation tank 31 is located at the highest level of the water in the tank 1 as indicated by dotted line at 22. The salt solution from the casing 1 flows directly up pipe 77 against the valve 78 and through a small hole in the same into the pulsation tank. When the salt solution substantially completely fills the tank 31 it operates the floats 75 and 76 which through arm 79 operate the slotted lever 80 connected to the 3-way valve 81. This establishes communication with tank 82 supplied with air under pressure by means of pump 83. The small hole in valve 78 prevents the water flowing rapidly into the pulsation tank 31, while the open valve 78 permits the water to flow rapidly from the pulsation tank into the casing. Fig. 6 shows the apparatus when the float valves 75 and 76 are lifted and when the 3-way valve is establishing communication between the tank 31 and the compressed air tank. In the position shown the compressed air will force water suddenly out of tank 31 back and upwardly in the casing 1 till float 76 is no longer completely submerged. The floats will lower and lever 80 will turn the 3-way valve 81 into a position to shut off communication between the compressed air tank 82 and the pulsation tank 31 and to establish communication between the pulsation tank and the atmosphere through opening 83' in the valve casing. The design shown in Fig. 6 may also be employed to produce disturbances in the body of silicates during the filtering phase, if pressure be maintained in the filter.

When hard water enters casing 1 through valve pipe line 6 and soft water leaves the casing through valved pipe line 7, pipe line 35 may be connected with pipe line 77 of Fig. 6 (not shown) and the lever 80 be connected by rods with the lever of a throttle valve (not shown) inserted in the soft water line 7, so that the throttle valve will be closed automatically as soon as the floats 75 and 76 connect air tank 82 with pulsation box 31 and open valve 78 in the pulsation box 31 (see Fig. 6). The closed throttle valve prevents the water discharged from box 31 from passing through pipe line 7 to the soft water supply and forces it to rise under the pressure of the air from tank 82 in the tank 1, there disaggregating the exchange material. The lowering of the floats 75 and 76 will move the lever 80 downwardly and the connecting rods between the lever and the throttle valve in pipe line 7 will reopen this throttle valve and soft water discharged from the casing will flow again through pipe line 7 to the soft water supply. After the floats 75 and 76 have gone down, valve 78 has been seated, and the air in box 31 can escape through hole 83' in the casing. The refilling of the pulsation box 31 may be accomplished by pipe line 77 through a small hole in valve 78. This hole permits water to flow slowly from filter 1, which is under pressure, to box 31.

If the water to be softened passes through the casing upwardly, i. e. if it enters into the casing by pipe line 7 and leaves it as soft water through pipe line 6, then pipe line 7 must be connected with pipe 77 of the pulsation box 31 and a check valve must be inserted between this connection and the hard water supply in order to prevent the water discharged from pulsation box 31 to flow back to the hard water supply. The provision of a throttle valve, connected to the floats 75 and 76, is unnecessary in this event.

What I claim is:—

1. The process of operating water softening devices having a bed of granular exchange silicates or zeolites for the purpose of giving increased efficiency to said zeolites which comprises producing occasional sudden pulsations in liquids flowing therethrough, such pulsations being energetic enough to cause a disturbance of the granular exchange of materials.

2. The process of operating water softening devices having a bed of granular exchange silicates or zeolites, wherein water to be softened and regenerating liquid are alternately transmitted through said bed of granular material, for the purpose of giving increased efficiency to said zeolites which comprises producing occasional pulsations in the regenerating liquid while flowing therethrough, such pulsations being energetic enough to cause a disturbance of the granular material.

3. The process of operating water softening devices having a bed of granular exchange silicates or zeolites for the purpose of giving increased efficiency to said zeolites which comprises passing a liquid therethrough in continuous downward flow, a portion of such flow being removed from the system while another portion is stored until a sufficient volume is accumulated, the stored liquid being then energetically transmitted into the bottom of the bed.

4. The process of operating water softening devices having a bed of granular exchange silicates or zeolites for the purpose of giving increased efficiency to said zeolites which comprises flowing salt solution therethrough in continuous flow, a portion of such flow being removed from the system while another portion is stored until a sufficient volume is accumulated, the stored liquid being then energetically transmitted into the bottom of the bed.

5. The process of softening water which comprises establishing and maintaining a bed of granular base exchanging materials, passing hard water to be softened therethrough, regenerating the said materials by passing a solution of regenerating fluid therethrough, and at some period during the passage of said regenerating fluid suddenly increasing its rate of flow whereby the said material is caused to move.

6. The process of softening water which comprises passing through a bed of granular water softening material hard water to be softened, wash water for cleansing purposes, and regenerating fluid for restoring the exchange properties of the bed, and during one of said passages suddenly increasing the rate of flow of the fluid through the bed to disturb the particles thereof.

7. In the operation of water treating apparatus the process which comprises passing a fluid through said apparatus and during its passage suddenly increasing the rate of flow without cessation thereof.

8. A water softening apparatus comprising a main tank, a granular bed of exchange silicates or zeolites within the tank, means for feeding raw water thereto and for removing softened water, means for washing the bed of exchange silicates, means for passing a regenerating salt solution through the bed and means for causing a sudden pulsatory movement in the flow of liquids passing through the bed of exchange silicates.

9. An apparatus for treating water comprising a casing, a bed of material through which the water is passed, means for flowing water to be treated through the material, means for flowing another fluid through the material to act upon the same, and means for causing a pulsation of one of the fluids during its flow through the said material.

10. An apparatus for treating water comprising a casing, granular zeolite material in the casing, means for passing fluid through the material, a normally open exit for passing fluid out of the casing, a siphon box, means for delivering fluid to the siphon box, a siphon in communication with the casing to deliver fluid from the box through the material, and means in communication with the siphon and said normally open exit to close the same and prevent flow of fluid out of the casing through said exit during operation of the siphon.

11. An apparatus for treating water comprising a casing, granular zeolite material in the casing, means for passing fluid upwardly through the material, a normally open exit for passage of the fluid out of the casing, a siphon box, means for delivering fluid to the siphon box, a siphon in communication with the casing to deliver fluid from the said box upwardly through the material, and means in communication with the siphon and said normally open exit to close the same and prevent flow of fluid out of the casing through said exit during the operation of the siphon.

12. In a water softening apparatus a main casing and a bed of granular zeolite material therein, means for passing a fluid through the said bed and additional means for delivering a part of said fluid to a siphon box, a siphon box adapted to receive said portion of fluid, a siphon therein and adapted to operate to empty said box at a predetermined level of the solution therein and means in communication with the said casing and in communication with the siphon and operable through the flow of water through the siphon to temporarily prevent exit of solution from the casing.

13. A water softening apparatus comprising a main tank, connections thereon for passing water to be softened therethrough, a bed of exchange silicates therein, a tank for supplying salt solution to the main tank with proper connections therefor, a second tank in communication with the main tank and a pump in the said connection for supplying fluid from the main tank to the said second tank, siphon leading from the said second tank to the main tank and arranged in said second tank to operate when the fluid therein has reached a predetermined level, whereby as the salt solution from the salt tank flows through the said main tank and the body of exchange material therein the said pump will deliver salt solution to the said second tank and whereby said siphon will operate to suddenly empty the said second tank and thus increase the rate of flow of salt solution through the main tank.

14. A water softening apparatus comprising a main tank, a bed of exchange silicates or zeolites within the tank, means for passing water to be softened through the bed, and means for passing salt solution through the bed upwardly, such means comprising a salt solution receptacle, and a pipe leading therefrom to the bottom of the casing, and means for tapping the supply of salt solution delivered by said salt solution receptacle and temporarily storing it and means for suddenly returning such temporarily stored salt solution to the point from which it was tapped during the flow of salt solution from said salt solution receptacle.

In testimony whereof, I affix my signature.

THO. R. DUGGAN.